(12) United States Patent
Ling et al.

(10) Patent No.: US 12,735,017 B2
(45) Date of Patent: Sep. 15, 2026

(54) BRAKE ASSEMBLY, BRAKE SYSTEM, VEHICLE, AND BRAKE SYSTEM CONTROL METHOD

(71) Applicant: Yinwang Intelligent Technologies Co., Ltd., Shenzhen (CN)

(72) Inventors: Mingze Ling, Shanghai (CN); Wentao Ma, Shenzhen (CN); Feibai Zhu, Shenzhen (CN); Yongyou Zhou, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 255 days.

(21) Appl. No.: 18/619,967

(22) Filed: Mar. 28, 2024

(65) Prior Publication Data

US 2024/0239323 A1 Jul. 18, 2024

Related U.S. Application Data

(63) Continuation of application No. PCT/CN2021/122327, filed on Sep. 30, 2021.

(51) Int. Cl.
*B60T 13/74* (2006.01)
*B60T 13/66* (2006.01)

(52) U.S. Cl.
CPC .......... *B60T 13/741* (2013.01); *B60T 13/662* (2013.01); *B60T 13/746* (2013.01)

(58) Field of Classification Search
CPC ................. B60T 13/741; B60T 13/746; F16D 2055/0029; F16D 2065/1396; F16D 2125/40; F16D 2127/02
See application file for complete search history.

(56) References Cited

U.S. PATENT DOCUMENTS 4,809,824 A 3/1989 Fargier et al.
5,348,123 A 9/1994 Takahashi et al.
10,697,510 B2 6/2020 Baehrle-Miller et al.
2014/0000990 A1* 1/2014 Shiraki ................ F16D 65/567 188/71.8
2014/0231189 A1* 8/2014 Park ....................... F16D 65/18 188/72.3
2015/0308525 A1* 10/2015 Kim ................... F16D 65/0068 188/71.8

(Continued)

FOREIGN PATENT DOCUMENTS

CN 103994164 A 8/2014
CN 106573612 A 4/2017

(Continued)

*Primary Examiner* — Nicholas J Lane
(74) *Attorney, Agent, or Firm* — Conley Rose, P.C.

(57) ABSTRACT

A brake assembly includes a cylinder body, a piston, an elastic piece, and a driving piece. The piston is mounted in an inner cavity of the cylinder body, so that the piston and the inner cavity of the cylinder body form an accommodating cavity. The driving piece and the elastic piece are disposed in the accommodating cavity, and the driving piece is connected to the piston through the elastic piece. The driving piece drives, through the elastic piece, the piston to move, so as to drive a brake to brake. When braking is canceled, the elastic piece can provide a pulling force for the piston, so that the piston is reset quickly.

20 Claims, 9 Drawing Sheets

(56) References Cited

U.S. PATENT DOCUMENTS

| | | | | |
|---|---|---|---|---|
| 2016/0333951 | A1 | 11/2016 | Lee | |
| 2017/0097060 | A1* | 4/2017 | Baehrle-Miller | B60T 13/741 |
| 2017/0314627 | A1 | 11/2017 | Hyun et al. | |
| 2018/0298969 | A1* | 10/2018 | Demorais | F16D 55/226 |
| 2022/0389981 | A1* | 12/2022 | Leiter | F16D 65/18 |

FOREIGN PATENT DOCUMENTS

| | | | |
|---|---|---|---|
| CN | 108058615 | A | 5/2018 |
| CN | 208997234 | U | 6/2019 |
| CN | 110259851 | A | 9/2019 |
| CN | 112672934 | A | 4/2021 |
| WO | 2007148227 | A1 | 12/2007 |

* cited by examiner

BRAKE ASSEMBLY, BRAKE SYSTEM, VEHICLE, AND BRAKE SYSTEM CONTROL METHOD

CROSS-REFERENCE TO RELATED APPLICATIONS

This is a continuation of International Patent Application No. PCT/CN2021/122327 filed on Sep. 30, 2021, the disclosure of which is hereby incorporated by reference in its entirety.

TECHNICAL FIELD

This application relates to the field of vehicle technologies, and in particular, to a brake assembly, a brake system, a vehicle, and a brake system control method.

BACKGROUND

When a vehicle is in use, the vehicle often needs to be braked. Vehicle parking is used as an example. With development of technologies, a brake mode based on an electric parking brake emerges. A user sends an instruction to an electronic control unit by controlling a pushbutton switch, the electronic control unit controls a brake assembly, and the brake assembly drives a friction block of a brake to clamp a brake disc to perform braking, so as to implement parking. Currently, the park mode based on the electric parking brake produces a dragging torque, increases travel resistance of a vehicle, and causes the brake to heat up.

SUMMARY

This application provides a brake assembly, a brake system, a vehicle, and a brake system control method, so that a friction block of a brake can be quickly separated from a brake disc. This reduces a generated dragging torque, reduces travel resistance of a vehicle, and enhances energy saving effect of the vehicle. In addition, the solutions help improve reliability and a service life of the brake, and improve vehicle safety.

According to a first aspect, this application provides a brake assembly. The brake assembly includes a cylinder body, a piston, an elastic piece and a driving piece. The piston is mounted in an inner cavity of the cylinder body, and the piston can move in the inner cavity of the cylinder body. The piston and the inner cavity of the cylinder body form an accommodating cavity. The driving piece and the elastic piece are disposed in the accommodating cavity, and the driving piece is connected to the piston through the elastic piece. In other words, two ends of the elastic piece are respectively fixedly connected to the driving piece and the piston. The driving piece is configured to drive the piston to move in the inner cavity of the cylinder body. In an actual use process, the piston can be connected to a brake, so as to drive the brake to brake. In this solution, when braking is required, the driving piece may be enabled to push the piston to move. When braking needs to be canceled, the driving piece may be enabled to pull the piston to move. It should be noted that, when a hydraulic apparatus is used for braking, although the driving piece does not move when braking is canceled, the elastic piece is in a stretching state between the driving piece and the piston, so that the piston may also be pulled to move and reset. In conclusion, in the technical solution of this application, when braking is canceled, the elastic piece may provide a pulling force for the piston, so that the piston is reset quickly. Therefore, in this solution, the elastic piece is used to drive the piston to quickly reset, so as to drive the friction block to be detached from a brake disc in a short time, so that the brake completely cancels a braking state. This can overcome a problem of severe adhesion between the friction block and the brake disc caused by a long braking time or an excessively large braking force, and resolve a problem of a large vehicle dragging torque. This solution can help reduce a dragging torque, reduce travel resistance of a vehicle, and enhance energy saving effect of the vehicle. In addition, this solution helps reduce heat generated by the brake, improve reliability and a service life of the brake, and improve vehicle safety.

The driving piece in this application may include a screw and a nut. The screw and the nut implement a transmission connection through threads. In other words, the screw rotates to drive the nut to move in an axial direction of the screw. The screw is connected to a motor assembly. The motor assembly may drive the screw to rotate, so as to drive the nut to move, and the nut drives the piston to move through the elastic piece. In this solution, the screw and the nut are cooperated to form the driving piece. In this way, structure stability is high and costs are low.

A specific structure of the elastic piece in the foregoing technical solution is not limited in this application, provided that the elastic piece is elastic. For example, the elastic piece may be a spring or a rubber elastic piece.

In addition, a specific mounting manner of the elastic piece in the foregoing technical solution is not limited in this application. For example, one end of the elastic piece may be directly fixedly connected to the driving piece, and the other end may be directly connected to the piston through driving. Alternatively, a connection may be implemented in cooperation with another structure. For example, a side that is of the driving piece and that faces the piston has a first non-flat end face, a side that is of the piston and that faces the driving piece has a second non-flat end face, and the elastic piece is connected between the first non-flat end face and the second non-flat end face. The following enumerates specific connection manners of several elastic pieces.

The driving piece may have a first limiting protrusion, and the elastic piece is sleeved on an outer side of the first limiting protrusion. In this case, the first limiting protrusion can improve mounting stability of the elastic piece, and can guide the elastic piece to a specific extent, so that the elastic piece is not easily bent. Alternatively, the driving piece may have a first limiting groove, and the elastic piece is disposed in the first limiting groove. Therefore, the first limiting groove can improve mounting stability of the elastic piece, and can guide the elastic piece to a specific extent, so that the elastic piece is not easily bent. Similarly, for one side of the piston, the piston may also have a second limiting protrusion or a second limiting groove. When the piston has the second limiting protrusion, the elastic piece is sleeved on an outer side of the second limiting protrusion. In this case, the second limiting protrusion can improve mounting stability of the elastic piece, and can guide the elastic piece to a specific extent, so that the elastic piece is not easily bent. When the piston has the second limiting groove, the elastic piece is disposed in the second limiting groove. Therefore, the second limiting groove can improve mounting stability of the elastic piece, and can guide the elastic piece to a specific extent, so that the elastic piece is not easily bent.

In a specific technical solution, the driving piece may have a first limiting protrusion, and the piston may have a second limiting protrusion. Alternatively, the driving piece has a first limiting groove, and the piston has a second limiting groove. Alternatively, the driving piece may have a first limiting protrusion, and the piston may have a second limiting groove. In this case, when the elastic piece shrinks, the first limiting protrusion may extend into the second limiting groove. This helps reduce a size of the elastic piece, so as to reduce a size of the entire brake assembly. Similarly, when the driving piece has a first limiting groove, the piston has a second limiting protrusion, and the elastic piece shrinks, the second limiting protrusion may extend into the first limiting groove. This also helps reduce a size of the elastic piece, so as to reduce a size of the entire brake assembly.

In another technical solution, a first limiting piece may be further mounted on the driving piece, and the first limiting piece is pivotally mounted on the driving piece. In other words, the first limiting piece may rotate relative to the driving piece, but cannot move. A second limiting piece is mounted on the piston, and the second limiting piece is pivotally mounted on the piston. Similarly, the second limiting piece may rotate relative to the piston, but cannot move. The elastic piece is disposed between the first limiting piece and the second limiting piece, and the elastic piece can rotate relative to the piston and the nut. This helps improve flexibility of the elastic piece and reduce a possible twist stress generated in the elastic piece.

The driving piece may further have a first mounting boss for mounting the first limiting piece and the second limiting piece, and the first limiting piece is pivotally mounted on the first mounting boss. The piston has a second mounting boss, and the second limiting piece is pivotally mounted on the second mounting boss.

According to a second aspect, this application further provides a brake system. The brake system includes a cylinder body, a piston, an elastic piece, a driving piece, and a motor assembly. The piston is mounted in an inner cavity of the cylinder body, so that the piston and the inner cavity of the cylinder body form an accommodating cavity. The driving piece and the elastic piece are disposed in the accommodating cavity, and the driving piece is connected to the piston through the elastic piece. The motor assembly is in a transmission connection to the driving piece. In other words, the motor assembly may drive the driving piece to move, and drive, through the elastic piece, the piston to move. In an actual use process, the piston can be connected to a brake, so as to drive the brake to brake. In this solution, when the motor assembly rotates forward, the piston is pushed to move through the driving piece, to perform braking. When the motor assembly rotates backward, the piston is pulled to move through the driving piece, to cancel braking. Certainly, alternatively, braking may be canceled when the motor assembly rotates forward, and braking may be performed when the motor assembly rotates backward. It should be noted that, when a hydraulic apparatus is used for braking, although the driving piece does not move when braking is canceled, the elastic piece is in a stretching state between the driving piece and the piston, so that the piston may also be pulled to move and reset. In conclusion, in the technical solution of this application, when braking is canceled, the elastic piece may provide a pulling force for the piston, so that the piston is reset quickly. Therefore, the solution can help reduce a dragging torque, reduce travel resistance of a vehicle, and enhance energy saving effect of the vehicle. In addition, this solution helps reduce heat generated by the brake, improve reliability and a service life of the brake, and improve vehicle safety.

The driving piece in the technical solution of this application may include a screw and a nut. The screw and the nut implement a transmission connection through threads. In other words, the screw rotates to drive the nut to move in an axial direction of the screw. The screw is connected to the motor assembly. The motor assembly may drive the screw to rotate, so as to drive the nut to move, and the nut drives the piston to move through the elastic piece. In this solution, the screw and the nut are cooperated to form the driving piece. In this way, structure stability is high and costs are low.

A specific structure of the elastic piece in the foregoing technical solution is not limited in this application, provided that the elastic piece is elastic. For example, the elastic piece may be a spring or a rubber elastic piece.

In addition, a specific mounting manner of the elastic piece in the foregoing technical solution is not limited in this application. For example, one end of the elastic piece may be directly fixedly connected to the driving piece, and the other end may be directly connected to the piston through driving. Alternatively, a connection may be implemented in cooperation with another structure. The following enumerates specific connection manners of several elastic pieces.

The driving piece may have a first limiting protrusion, and the elastic piece is sleeved on an outer side of the first limiting protrusion. In this case, the first limiting protrusion can improve mounting stability of the elastic piece, and can guide the elastic piece to a specific extent, so that the elastic piece is not easily bent. Alternatively, the driving piece may have a first limiting groove, and the elastic piece is disposed in the first limiting groove. Therefore, the first limiting groove can improve mounting stability of the elastic piece, and can guide the elastic piece to a specific extent, so that the elastic piece is not easily bent. Similarly, for one side of the piston, the piston may also have a second limiting protrusion or a second limiting groove. When the piston has the second limiting protrusion, the elastic piece is sleeved on an outer side of the second limiting protrusion. In this case, the second limiting protrusion can improve mounting stability of the elastic piece, and can guide the elastic piece to a specific extent, so that the elastic piece is not easily bent. When the piston has the second limiting groove, the elastic piece is disposed in the second limiting groove. Therefore, the second limiting groove can improve mounting stability of the elastic piece, and can guide the elastic piece to a specific extent, so that the elastic piece is not easily bent.

In a specific technical solution, the driving piece may have a first limiting protrusion, and the piston may have a second limiting protrusion. Alternatively, the driving piece has a first limiting groove, and the piston has a second limiting groove. Alternatively, the driving piece may have a first limiting protrusion, and the piston may have a second limiting groove. In this case, when the elastic piece shrinks, the first limiting protrusion may extend into the second limiting groove. This helps reduce a size of the elastic piece, so as to reduce a size of the entire brake system. Similarly, when the driving piece has a first limiting groove, the piston has a second limiting protrusion, and the elastic piece shrinks, the second limiting protrusion may extend into the first limiting groove. This also helps reduce a size of the elastic piece, so as to reduce a size of the entire brake system.

In another technical solution, a first limiting piece may be further mounted on the driving piece, and the first limiting piece is pivotally mounted on the driving piece. In other words, the first limiting piece may rotate relative to the driving piece, but cannot move. A second limiting piece is mounted on the piston, and the second limiting piece is pivotally mounted on the piston. Similarly, the second limiting piece may rotate relative to the piston, but cannot move. The elastic piece is disposed between the first limiting piece and the second limiting piece, and the elastic piece can rotate relative to the piston and the nut. This helps improve flexibility of the elastic piece and reduce a possible twist stress generated in the elastic piece.

The driving piece may further have a first mounting boss for mounting the first limiting piece and the second limiting piece, and the first limiting piece is pivotally mounted on the first mounting boss. The piston has a second mounting boss, and the second limiting piece is pivotally mounted on the second mounting boss.

The brake system may further include a brake. The brake is connected to the piston in the brake assembly. In this case, when the driving piece drives the piston to move under driving of the motor assembly, the motor assembly may apply a motor braking force to the brake, to drive the brake to brake. Certainly, for example, the forward rotation of the motor assembly drives the brake to brake. In this case, the backward rotation of the motor assembly may drive the brake to cancel braking. In this solution, because the elastic piece can drive the piston to reset quickly when braking is canceled, the brake system has a small dragging torque. This can reduce travel resistance of the vehicle and enhance energy saving effect of the vehicle. In addition, the solution helps improve reliability and a service life of the brake, and improve vehicle safety.

In a specific technical solution, the brake may include a brake disc, a first friction block, and a second friction block. The first friction block is in a transmission connection to the second friction block, and the first friction block and the second friction block can move close to each other or move away from each other. In other words, when the first friction block is driven to move, the second friction block moves simultaneously, and the first friction block and the second friction block move in opposite directions. Alternatively, when the second friction block is driven to move, the first friction block moves simultaneously, and the first friction block and the second friction block move in opposite directions. The brake disc is disposed between the first friction block and the second friction block, and in a process of moving of the first friction block and the second friction block, the brake disc is clamped or the brake disc is released. The first friction block is connected to the piston, and the driving piece drives the piston to move, to drive the first friction block and the second friction block to clamp or release the brake disc. When braking is cancelled, the driving piece drives the piston to reset through the elastic piece, and the piston drives a friction block to be detached from the brake disc. This can reduce adhesion between the friction block and the brake disc.

The brake system may further include a hydraulic apparatus, and the hydraulic apparatus is connected to the accommodating cavity formed by the cylinder body and the piston, so that the hydraulic apparatus may inject or extract liquid into the accommodating cavity, so as to drive the piston to move. In other words, the hydraulic apparatus applies a hydraulic braking force to the brake through the piston, and drives the brake to brake. In this solution, the brake system may perform braking in two manners, and application scenarios are rich. In addition, after the hydraulic apparatus is used for braking, when braking is canceled, the elastic piece can still drive the piston to quickly reset. This can reduce a dragging torque and situations of a hydraulic pump of the hydraulic apparatus being stuck.

The brake system may further include an electronic control unit. The electronic control unit is in a signal connection to the motor assembly, and the electronic control unit controls the motor assembly to rotate forward, rotate backward, or stop rotating. In this solution, the electronic control unit may be used to control braking of the vehicle. The electronic control unit may be started by using a manual control button, to control braking of the vehicle. The electronic control unit can also be connected to a controller to intelligently determine a current status of the vehicle for braking. For example, this is applied to an autonomous driving mode.

When the electronic control unit may be used in a vehicle parking scenario, the electronic control unit is configured to: determine whether a parking condition meets a parking requirement; determine, based on the parking requirement, a requested parking force when the parking condition meets the parking requirement; or when the parking condition does not meet the parking requirement, end control; calculate a target parking force based on the determined requested parking force and the status of the vehicle; and apply a first parking force to the vehicle until the first parking force meets the target parking force. In this solution, the target parking force may be first determined, so that an excessively large parking force can be prevented, and a probability of adhesion between the friction block and the brake disc can be reduced.

When the brake system further includes the hydraulic apparatus, and the electronic control unit is further in a signal connection to the hydraulic apparatus, applying the first parking force to the vehicle includes: determining whether the hydraulic apparatus participates in parking braking; and if the hydraulic apparatus participates in parking braking, controlling the hydraulic apparatus to apply a hydraulic braking force, and controlling the motor assembly to apply a motor braking force, where a combined force of the hydraulic braking force and the motor braking force is the first parking force, that is, the first parking force includes the hydraulic braking force and the motor braking force; or if the hydraulic apparatus does not participate in parking braking, controlling the motor assembly to apply a motor braking force, where the motor braking force is the first parking force. In this solution, the first parking force to which the brake is subject may be controlled as the target parking force with reference to braking forces separately provided by the hydraulic apparatus and the motor assembly, so as to avoid a case in which an excessively large parking force is caused because the hydraulic apparatus and the motor assembly are separately controlled.

In a specific technical solution, the parking requirement includes an external requirement and an electric parking brake requirement, and the electronic control unit is configured to: determine whether the parking condition meets the electric parking brake requirement; and if the parking condition meets the electric parking brake requirement, determine that a first requested parking force requested in the electric parking brake requirement is the requested parking force; or if the parking condition does not meet the electric parking brake requirement, determine whether the parking condition meets the external requirement; and if the parking condition meets the external requirement, determine that a second requested parking force requested in the external requirement is the requested parking force. In this solution, the vehicle may receive two parking requirements: an external requirement and an electric parking brake requirement. When there is an electric parking brake requirement, the vehicle responds to the electric parking brake requirement. If there is no electric parking brake requirement, the vehicle may respond to the external requirement. The external requirement includes a parking request from another component other than the electronic control unit, and the electric parking brake requirement includes a parking request triggered by a driver by using the electronic control unit.

The status of the vehicle may include one or more of a ramp on which the vehicle is located, a mass of the vehicle, whether a trailer is attached to the vehicle, and a temperature of the brake disc. In other words, when calculating the target parking force, the electronic control unit may calculate the target parking force of the vehicle based on the requested parking force, the ramp on which the vehicle is located, the mass of the vehicle, whether the trailer is attached to the vehicle, and the temperature of the brake disc. In this way, the vehicle can be reliably parked, and a parking force is not excessively large.

According to a third aspect, this application further provides a vehicle. The vehicle includes the brake assembly in the first aspect, and further includes wheels connected to the brake assembly, and the brake assembly may brake the wheels. The brake assembly may be directly connected to the wheels, or may be connected the wheels through an intermediate structure, provided that the brake assembly can brake the wheels. The brake assembly in this solution can drive a friction block of a brake to be quickly separated from a brake disc. This reduces a generated dragging torque, reduces travel resistance of the vehicle, and enhances energy saving effect of the vehicle. In addition, the solution helps improve reliability and a service life of the brake, and improve vehicle safety.

According to a fourth aspect, this application further provides a vehicle. The vehicle includes the brake system in the second aspect, and further includes wheels connected to the brake system, and the brake system may brake the wheels. Specifically, the brake system may be directly connected to the wheels, or may be connected the wheels through an intermediate structure, provided that the brake system can brake the wheels. The brake system in this solution can drive a friction block of a brake to be quickly separated from a brake disc. This reduces a generated dragging torque, reduces travel resistance of the vehicle, and enhances energy saving effect of the vehicle. In addition, the solution helps improve reliability and a service life of the brake, and improve vehicle safety.

According to a fifth aspect, this application further provides a control method. The control method is applied to the brake system in the second aspect. The control method includes: determining, based on a parking requirement, a requested parking force when a parking condition meets the parking requirement; calculating a target parking force based on the determined requested parking force and a status of a vehicle; and applying a first parking force to the vehicle until the first parking force meets the target parking force.

When the brake system further includes a hydraulic apparatus, the applying a first parking force to the vehicle includes: determining whether the hydraulic apparatus participates in parking braking; and if the hydraulic apparatus participates in parking braking, controlling the hydraulic apparatus to apply a hydraulic braking force, and controlling a motor assembly to apply a motor braking force, where a combined force of the hydraulic braking force and the motor braking force is the first parking force, that is, the first parking force includes the hydraulic braking force and the motor braking force; or if the hydraulic apparatus does not participate in parking braking, controlling a motor assembly to apply a motor braking force, where the motor braking force is the first parking force. In other words, the first parking force to which a brake is subject may be controlled as the target parking force with reference to braking forces separately provided by the hydraulic apparatus and the motor assembly, to avoid an excessively large parking force caused due to separate control.

The parking requirement includes an external requirement and an electric parking brake requirement. The determining, based on a parking requirement, a requested parking force when a parking condition meets the parking requirement includes: determining whether the parking condition meets the electric parking brake requirement; and if the parking condition meets the electric parking brake requirement, determining that a first requested parking force requested in the electric parking brake requirement is the requested parking force; or if the parking condition does not meet the electric parking brake requirement, determining whether the parking condition meets the external requirement; and if the parking condition meets the external requirement, determining that a second requested parking force requested in the external requirement is the requested parking force. In this solution, the vehicle may receive two parking requirements: an external requirement and an electric parking brake requirement. When there is an electric parking brake requirement, the vehicle responds to the electric parking brake requirement. If there is no electric parking brake requirement, the vehicle may respond to the external requirement. The external requirement includes a parking request from another component other than an electronic control unit, and the electric parking brake requirement includes a parking request triggered by a driver by using the electronic control unit.

The status of the vehicle may include one or more of a ramp on which the vehicle is located, a mass of the vehicle, whether a trailer is attached to the vehicle, and a temperature of a brake disc. In other words, when calculating the target parking force, the electronic control unit may calculate the target parking force of the vehicle based on the requested parking force, the ramp on which the vehicle is located, the mass of the vehicle, whether the trailer is attached to the vehicle, and the temperature of the brake disc. In this way, the vehicle can be reliably parked, and a parking force is not excessively large.

REFERENCE NUMERALS

100: brake assembly;
110: cylinder body;
120: piston;
121: second limiting protrusion;
122: second limiting groove;
123: second limiting piece;
124: second mounting boss;
130: elastic piece;
140: nut;
141: first limiting protrusion;
142: first limiting groove;
143: first limiting piece;
144: first mounting boss;
150: screw;
160: motor assembly;
170: accommodating cavity;
200: brake system;
210: brake;
211: brake disc;
212: first friction block;
213: second friction block;
300: hydraulic apparatus;
400: electronic control unit;
500: wheel.

DESCRIPTION OF EMBODIMENTS

To facilitate understanding of a brake assembly, a brake system, a vehicle, and a brake assembly control method provided in embodiments of this application, the following describes an application scenario of the brake assembly, the brake system, the vehicle, and the brake assembly control method. The brake system is an important part of the vehicle and plays an important role in safety and performance of the vehicle. At present, when a car is braked, a brake assembly is used to drive friction plates to clamp a brake disc for braking, and when braking is stopped, the friction plates may be stuck to the brake disc. When the friction plates are stuck to the brake disc, the car is in a braking state. This causes a dragging torque and increases travel resistance. In addition, it is easy to cause a brake to heat. In this way, reliability and a service life of the brake are reduced, and the vehicle has a safety risk.

The following describes in detail embodiments of this application with reference to accompanying drawings. Terms used in the following embodiments are merely intended to describe specific embodiments, but are not intended to limit this application. The terms "one", "a", and "this" of singular forms used in this specification and the appended claims of this application are also intended to include expressions such as "one or more", unless otherwise specified in the context clearly.

Reference to "an embodiment", "a specific embodiment", or the like described in this specification indicates that one or more embodiments of this application include a specific feature, structure, or characteristic described with reference to embodiments. Terms "include", "contain", "have", and variants of the terms all mean "include but are not limited to", unless otherwise emphasized in other ways.

Figure 1:
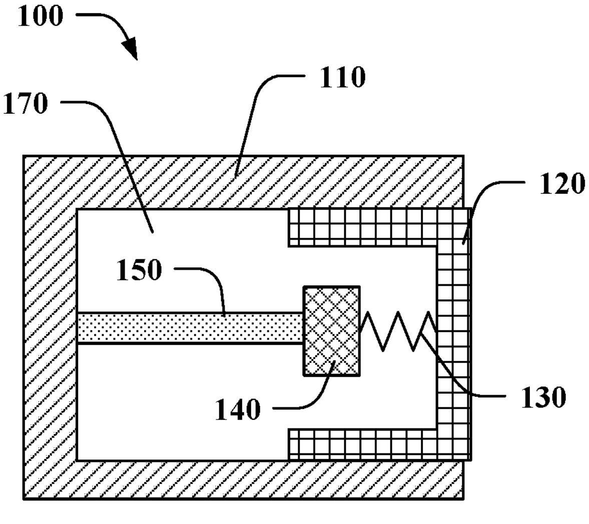
FIG. 1 is a schematic diagram of a structure of a brake assembly according to an embodiment of this application.

FIG. 1 is a schematic diagram of a structure of a brake assembly according to an embodiment of this application. As shown in FIG. 1, a brake assembly 100 includes a cylinder body 110, a piston 120, an elastic piece 130, and a driving piece. The piston 120 is mounted in an inner cavity of the cylinder body 110, so that the piston 120 and the inner cavity of the cylinder body 110 form an accommodating cavity 170. The driving piece and the elastic piece 130 are disposed in the accommodating cavity 170. The driving piece is connected to the piston 120 through the elastic piece 130, and the driving piece is configured to drive the piston 120 to move in the cylinder body 110. The driving piece is connected to the piston 120 through the elastic piece 130. In other words, the elastic piece 130 is connected between the driving piece and the piston 120, one end of the elastic piece 130 is connected to the driving piece, and the other end is connected to the piston 120. When the brake assembly 100 performs braking, the driving piece pushes the piston 120 to move. The driving piece first overcomes an elastic force of the elastic piece 130, and then drives the piston 120 to move, to drive a friction block to clamp a braking disc for braking. When the brake assembly 100 cancels braking, the driving piece pulls the piston 120 through the elastic piece 130 to reset, so that the piston 120 is reset quickly, to drive the friction block to be detached from the brake disc. In this solution, the elastic piece is used to drive the piston to quickly reset, so as to drive the friction block to be detached from the brake disc in a short time, so that a brake completely cancels a braking state. This can overcome a problem of severe adhesion between the friction block and the brake disc caused by a long braking time or an excessively large braking force, and resolve a problem of a large vehicle dragging torque. Therefore, this solution can help reduce a generated dragging torque, reduce travel resistance of a vehicle, and enhance energy saving effect of the vehicle. In addition, this solution helps reduce heat generated by the brake, so as to improve reliability and a service life of the brake, and improve vehicle safety.

The driving piece may include a nut 140 and a screw 150, and the nut 140 is connected to the screw 150 through threads. The screw 150 rotates to drive the nut 140 to move in an axial direction of the screw 150. The nut 140 is connected to the piston 120 through the elastic piece 130, so that the nut 140 may drive the piston 120 to move in the cylinder body 110. In this solution, the screw 150 and the nut 140 are cooperated to form the driving piece. In this way, structure stability is high and costs are low. In a specific embodiment, a specific structure of the elastic piece 130 is not limited. For example, the elastic piece 130 may be a spring, and the spring may be a straight-line spring, a gradually changing spring, a sheet spring, or the like.

Alternatively, the elastic piece 130 may be another elastic piece, provided that the nut 140 can be elastically connected to the piston 120. In an optional design, a tensile force F that can be implemented by the elastic piece 130 in this embodiment of this application is approximately F=10 N to 15 N, where N is a force unit Newton. A deformation amount x of the elastic piece 130 is about 1 millimeter (mm). According to Hooke's law, a spring constant K of a straight-line spring meets: K=F/x=10000 newtons per meter (N/m) to 15000 N/m, so as to facilitate miniaturization of the brake assembly 100.

In a specific technical solution, a material of the foregoing elastic piece is compatible with a brake fluid of a hydraulic apparatus connected to the brake assembly, so as to improve a service life of the elastic piece.

In some possible implementations, when the piston 120 is mounted on the cylinder body 110, an outer circumferential surface of the piston 120 may be closely attached to an inner circumferential surface of the cylinder body 110, so that a sealing cavity is formed between the piston 120 and the cylinder body. It should be noted that the sealing cavity herein mainly means that the piston 120 and the cylinder body 110 are connected in a sealed manner, and are in a sealed state in an actual working process, and the cylinder body may be provided with an opening. For example, the sealing cavity may also be connected to the hydraulic apparatus, so that the hydraulic apparatus can also work in the sealing cavity. In this case, the cylinder body 110 definitely includes an opening connected to the hydraulic apparatus. However, after the hydraulic apparatus is connected to the foregoing sealing cavity, the sealing cavity between the piston 120 and the cylinder body 110 is in the sealed state. Alternatively, the driving piece is disposed in the sealing cavity. A corresponding opening is also provided in the cylinder body 110 for mounting the driving piece. However, after the driving piece is mounted, the sealing cavity may be in the sealed state. These are not described one by one in this application. In addition, a sealing component may be disposed between the piston 120 and the cylinder body 110, to form the sealing cavity. More, the sealing component may be disposed between the outer circumferential surface of the piston and the inner circumferential surface of the cylinder body, to perform a sealing function. In an optional embodiment, the sealing component may include a plurality of sealing rings, and the plurality of sealing rings are disposed in parallel on a peripheral surface of the piston, to achieve better sealing effect.

Two ends of the elastic piece 130 are respectively fixedly connected to the driving piece and the piston 120 along a moving direction of the piston 120. However, a specific connection structure is not limited. For example, one end of the elastic piece may be directly fixedly connected to the driving piece, and the other end may be directly connected to the piston through driving. Alternatively, a connection may be implemented in cooperation with another structure. For example, a side that is of the driving piece and that faces the piston has a first non-flat end face, a side that is of the piston and that faces the driving piece has a second non-flat end face, and the elastic piece is connected between the first non-flat end face and the second non-flat end face. The driving piece may have a first limiting protrusion 141 or a first limiting groove 142, and the elastic piece 130 is fixedly connected to the first limiting protrusion 141 or the first limiting groove 142 of the driving piece. Alternatively, the piston 120 has a second limiting protrusion 121 or a second limiting groove 122, and the elastic piece 130 is fixedly connected to the second limiting protrusion 121 or the second limiting groove 122 of the piston 120. That a part "has" a structure means that a structure may be directly prepared on the part. The structure and the part may be an integrated structure, for example, an integrally formed structure, or mounted through a fastener. For example, the driving piece has the first limiting protrusion. The first limiting protrusion and the driving piece may be an integrally formed structure, or the first limiting protrusion and the driving piece are fixedly connected to form an integrally formed structure through welding, screw connection, bonding, or the like.

The following uses an example in which the driving piece includes the nut 140 and the screw 150 to enumerate several embodiments to describe possible implementations of disposing the elastic piece 130.

Figure 2:
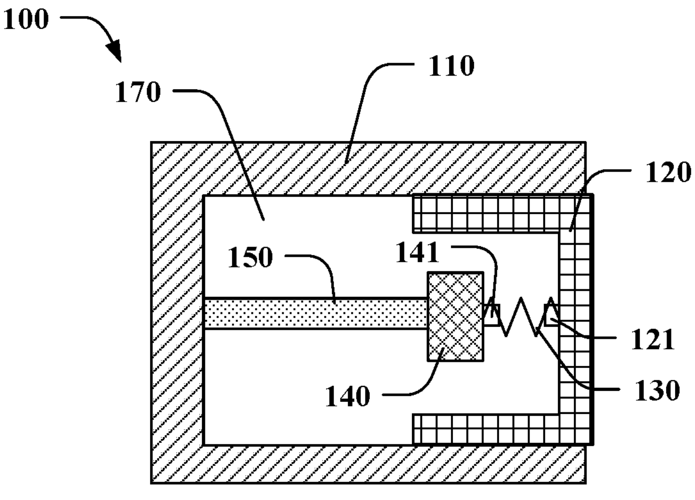
FIG. 2 is a schematic diagram of another structure of a brake assembly according to an embodiment of this application.

FIG. 2 is a schematic diagram of another structure of a brake assembly according to an embodiment of this application. As shown in FIG. 2, in an embodiment, the nut 140 has the first limiting protrusion 141, and the first limiting protrusion 141 is located on a side that is of the nut 140 and that faces the piston 120. The piston 120 has the second limiting protrusion 121, and the second limiting protrusion 121 is located on a side that is of the piston 120 and that faces the nut 140. The two ends of the elastic piece 130 are respectively sleeved on an outer side of the first limiting protrusion 141 and an outer side of the second limiting protrusion 121. In this solution, the first limiting protrusion 141 and the second limiting protrusion 121 can limit the elastic piece 130, and improve stability of the elastic piece 130, so that the elastic piece 130 deforms in the axial direction of the screw 150, and a problem like bending is not easily caused. The axial direction of the screw 150 is also a moving direction of the piston 120 and the nut 140.

It should be noted that a specific form of the first limiting protrusion 141 is not limited, provided that the elastic piece 130 can be sleeved on the outer side of the first limiting protrusion. For example, in the embodiment shown in FIG. 2, a surface that is of the nut 140 and that faces the piston 120 has a protruding first limiting protrusion 141. In other words, a surface of a part that is of the nut and that does not have the first limiting protrusion 141 is lower than the first limiting protrusion 141. Alternatively, the nut may have a gap on a periphery of the first limiting protrusion 141, so that the elastic piece can extend into the gap. A specific form of the second limiting protrusion 121 is not limited, provided that the elastic piece 130 can be sleeved on the outer side of the second limiting protrusion 121. For example, in the embodiment shown in FIG. 2, a surface that is of the piston 120 and that faces the nut 140 has a protruding second limiting protrusion 121. In other words, a surface of a part that is of the piston 120 and that does not have the second limiting protrusion 121 is lower than the second limiting protrusion 121. Alternatively, the piston 120 may further have a gap on a periphery of the second limiting protrusion 121, so that the elastic piece 130 can extend into the gap.

Figure 3:
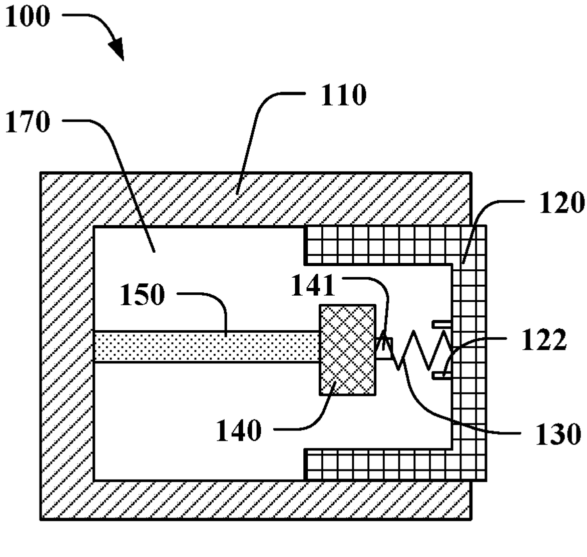
FIG. 3 is a schematic diagram of another structure of a brake assembly according to an embodiment of this application.

FIG. 3 is a schematic diagram of another structure of a brake assembly according to an embodiment of this application. As shown in FIG. 3, in an embodiment, the nut 140 has the first limiting protrusion 141, and the first limiting protrusion 141 is located on the side that is of the nut 140 and that faces the piston 120. The piston 120 has the second limiting groove 122, and the second limiting groove 122 is located on the side that is of the piston 120 and that faces the nut 140. One end of the elastic piece 130 is sleeved on the outer side of the first limiting protrusion 141, and the other end is located inside the second limiting groove 122. When the other end of the elastic piece 130 is located in the second limiting groove 122, the elastic piece 130 may be limited from a periphery of the elastic piece 130 by using the second limiting groove 122. In this solution, the first limiting protrusion 141 and the second limiting groove 122 can limit the elastic piece 130, and improve stability of the elastic piece 130, so that the elastic piece 130 deforms in the axial direction of the screw 150, and a problem like bending is not easily caused. The axial direction of the screw 150 is also the moving direction of the piston 120 and the nut 140. In addition, in this solution, when the nut 140 pushes the piston 120 to move, the nut 140 approaches the piston 120. In this case, the first limiting protrusion 141 may extend into the second limiting groove 122, so that a distance between the nut 140 and the piston 120 is short. This facilitates miniaturization of the brake assembly 100.

It should be noted that a specific form of the second limiting groove 122 is not limited either. For example, in the embodiment shown in FIG. 3, a protruding groove wall is prepared on the surface that is of the piston 120 and that faces the nut 140, to form the second limiting groove 122. Alternatively, in another embodiment, a material may be removed from the surface that is of the piston 120 and that faces the nut 140 to dig the second limiting groove 122.

Figure 4:
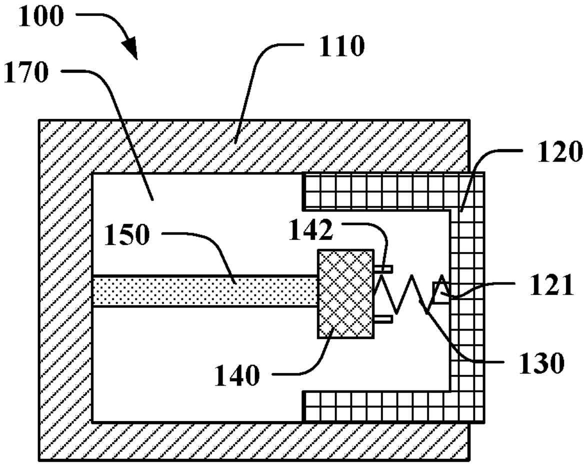
FIG. 4 is a schematic diagram of another structure of a brake assembly according to an embodiment of this application.

FIG. 4 is a schematic diagram of another structure of a brake assembly according to an embodiment of this application. As shown in FIG. 4, in an embodiment, the nut 140 has the first limiting groove 142, and the first limiting groove 142 is located on the side that is of the nut 140 and that faces the piston 120. The piston 120 has the second limiting protrusion 121, and the second limiting protrusion 121 is located on the side that is of the piston 120 and that faces the nut 140. One end of the elastic piece 130 is sleeved inside the first limiting groove 142, and the other end is sleeved outside the second limiting protrusion 121. In this solution, the first limiting groove 142 and the second limiting protrusion 121 can limit the elastic piece 130, and improve stability of the elastic piece 130, so that the elastic piece 130 deforms in the axial direction of the screw 150, and a problem like bending is not easily caused. The axial direction of the screw 150 is also the moving direction of the piston 120 and the nut 140. In addition, in this solution, when the nut 140 pushes the piston 120 to move, the nut 140 approaches the piston 120. In this case, the second limiting protrusion 121 may extend into the first limiting groove 142, so that the distance between the nut 140 and the piston 120 is short. This facilitates miniaturization of the brake assembly 100.

It should be noted that a specific form of the first limiting groove 142 is not limited either. For example, in the embodiment shown in FIG. 4, a protruding groove wall is prepared on the surface that is of the nut 140 and that faces the piston 120, to form the second limiting groove 122. Alternatively, in another embodiment, a material may be removed from the surface that is of the nut 140 and that faces the piston 120 to dig the second limiting groove 122.

Figure 5:
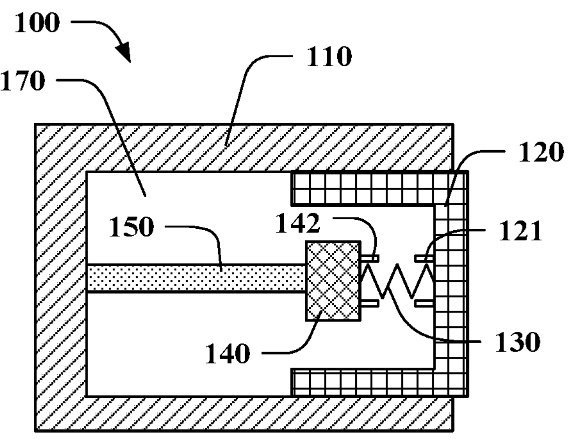
FIG. 5 is a schematic diagram of another structure of a brake assembly according to an embodiment of this application.

FIG. 5 is a schematic diagram of another structure of a brake assembly according to an embodiment of this application. As shown in FIG. 5, in an embodiment, the nut 140 has the first limiting groove 142, and the first limiting groove 142 is located on the side that is of the nut 140 and that faces the piston 120. The piston 120 has the second limiting groove 122, and the second limiting groove 122 is located on the side that is of the piston 120 and that faces the nut 140. The two ends of the elastic piece 130 are respectively disposed inside the first limiting groove 142 and inside the second limiting groove 122. In this solution, the first limiting groove 142 and the second limiting groove 122 can limit the elastic piece 130, and improve stability of the elastic piece 130, so that the elastic piece 130 deforms in the axial direction of the screw 150, and a problem like bending is not easily caused.

Figure 6:
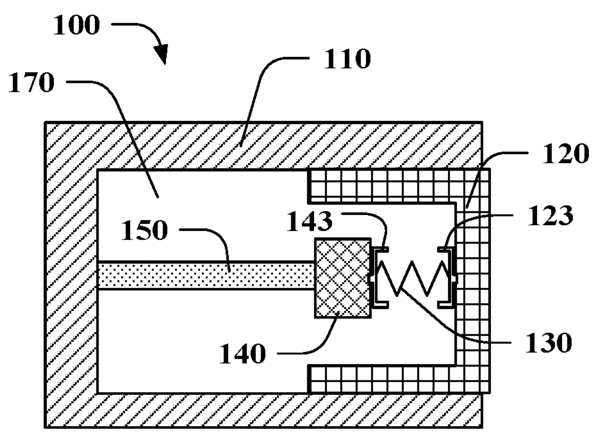
FIG. 6 is a schematic diagram of another structure of a brake assembly according to an embodiment of this application.

FIG. 6 is a schematic diagram of another structure of a brake assembly according to an embodiment of this application. As shown in FIG. 6, in an embodiment, a first limiting piece 143 is mounted on the nut 140, and the first limiting piece 143 is located on the side that is of the nut 140 and that faces the piston 120. In addition, the first limiting piece 143 is pivotally mounted on the nut 140, and an extension direction of a pivot is consistent with an extension direction of the elastic piece 130, that is, consistent with a direction of the nut 140 facing the piston 120. Therefore, the first limiting piece 143 may rotate around an axial direction of the elastic piece 130. The piston 120 has a second limiting piece 123, and the second limiting piece 123 is located on the side that is of the piston 120 and that faces the nut 140. The second limiting piece 123 is pivotally mounted on the piston 120, and an extension direction of a pivot is consistent with the extension direction of the elastic piece 130, that is, consistent with the direction of the nut 140 facing the piston 120. Therefore, the second limiting piece 123 may rotate around the axial direction of the elastic piece 130. The elastic piece 130 is mounted between the first limiting piece 143 and the second limiting piece 123. In this solution, both the first limiting piece 143 and the second limiting piece 123 are rotatably mounted, and the elastic piece 130 may rotate, so as to reduce structural limitations of the nut 140 and the piston 120 along a circumferential direction of the screw 150, reduce a possible twist stress generated in the elastic piece, and improve flexibility of the elastic piece.

It should be noted that, that the first limiting piece 143 is mounted on the nut 140 means that the first limiting piece 143 is connected to the nut 140 in a mounting manner, and, is mounted on the nut 140 in a pivot manner. Similarly, that the second limiting piece 123 is mounted on the piston 120 means that the second limiting piece 123 is connected to the piston 120 in a mounting manner, and, is mounted on the piston 120 in a pivot manner.

Figure 7:
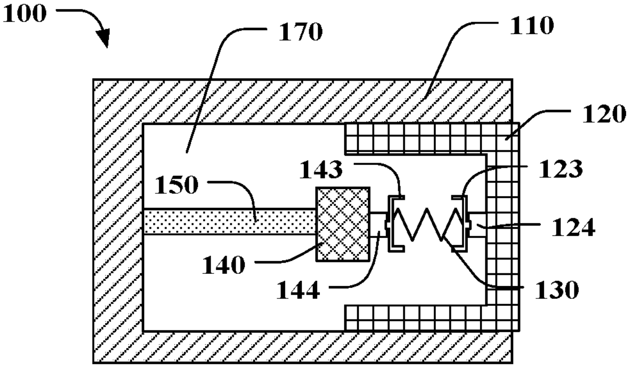
FIG. 7 is a schematic diagram of another structure of a brake assembly according to an embodiment of this application.

Specific mounting forms of the first limiting piece 143 and the second limiting piece 123 are not limited in this application either. For example, FIG. 7 is a schematic diagram of another structure of a brake assembly according to an embodiment of this application. As shown in FIG. 7, in another embodiment, the nut 140 has a first mounting boss 144, and the first limiting piece 143 is pivotally mounted on the first mounting boss 144. The piston 120 has a second mounting boss 124, and the second limiting piece 123 is pivotally mounted on the second mounting boss 124. Alternatively, only the nut 140 may be provided with the first mounting boss 144, and the piston 120 does not have the second mounting boss 124. Alternatively, only the piston 120 may have the second mounting boss 124, and the nut 140 does not have the first mounting boss 144.

Figure 8:
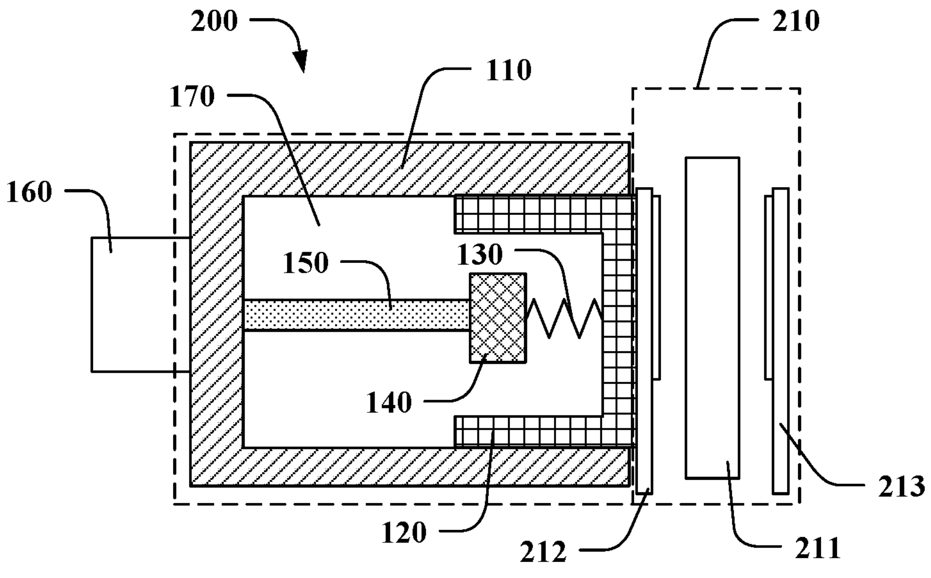
FIG. 8 is a schematic diagram of a structure of a brake system according to an embodiment of this application.

This application further provides a brake system. The following describes the brake system in embodiments of this application by using specific embodiments with reference to the accompanying drawings. FIG. 8 is a schematic diagram of a structure of a brake system according to an embodiment of this application. As shown in FIG. 8, a brake system 200 includes a motor assembly 160 and the brake assembly 100 in any one of the foregoing embodiments. The motor assembly 160 is in a transmission connection to a driving piece, and the driving piece may drive, driven by the motor assembly 160, a piston 120 to move in a cylinder body 110. In other words, the motor assembly 160 drives the piston

120 to move in the cylinder body 110. When the brake assembly 100 performs braking, the motor assembly 160 starts and gradually reaches a rated rotational speed of the motor assembly 160. The motor assembly 160 runs at a rated rotation speed for a period of time to eliminate an empty stroke. Then, when the driving piece is driven to push the piston 120 to move, the driving piece first overcomes an elastic force of an elastic piece 130, and then drive the piston 120 to move, so as to drive a friction block to clamp a braking disc for braking. When the brake assembly 100 cancels braking, a nut 140 pulls the piston 120 to reset through the elastic piece 130, so that the piston 120 is reset quickly, to drive the friction block to be detached from the brake disc. This can reduce a generated dragging torque, reduce travel resistance of a vehicle, and enhance energy saving effect of the vehicle. In addition, this solution helps reduce heat generated by a brake, so as to improve reliability and a service life of the brake, and improve vehicle safety.

The driving piece may include the nut 140 and a screw 150. The motor assembly 160 is in a transmission connection to the screw 150, to drive the screw 150 to rotate. The nut 140 is connected to the screw 150 through threads. The screw 150 rotates to drive the nut 140 to move in an axial direction of the screw 150. The nut 140 is connected to the piston 120 through the elastic piece 130, and the nut 140 may drive the piston 120 to move in the cylinder body 110. In other words, the motor assembly 160 drives the piston 120 to move in the cylinder body 110. In this solution, the screw 150 and the nut 140 are cooperated to form the driving piece. In this way, structure stability is high and costs are low.

It should be noted that, that the motor assembly 160 is in a transmission connection to the screw 150 means that the motor assembly 160 may transmit a driving force to the screw 150, or may be understood as that the motor assembly 160 may drive the screw to move through a transmission connection. In a specific implementation, the screw 150 may be directly connected to an output axis of the motor assembly 160, or the screw 150 may be connected to the motor assembly 160 through an intermediate structure. For example, a structure like a reducer is further disposed between the motor assembly 160 and the screw 150. In addition, it may be considered that the motor assembly 160 rotates forward, and drives the nut through the screw to push the piston to move, to perform braking; or the motor assembly 160 rotates backward, and drives the nut through the screw to pull the piston to move, to cancel braking. Certainly, alternatively, braking may be canceled when the motor assembly 160 rotates forward, and braking may be performed when the motor assembly 160 rotates backward. It should be noted that, when the hydraulic apparatus is used for braking, although the nut does not move when braking is canceled, the elastic piece is in a stretching state between the nut and the piston, and the piston may also be pulled to move.

Still refer to FIG. 8. In a specific embodiment, the foregoing brake system further includes a brake 210. The brake 210 is connected to the piston 120, and the motor assembly 160 may apply a motor driving force to the brake 210 through the piston 120, to drive the brake 210 to brake. For example, the forward rotation of the motor assembly 160 drives the brake to brake. In this case, the backward rotation of the motor assembly 160 may drive the brake to cancel braking. Certainly, alternatively, braking may be canceled when the motor assembly 160 rotates forward, and braking may be performed when the motor assembly 160 rotates backward. In this solution, the brake system 200 has a small dragging torque. This can reduce travel resistance of the vehicle and enhance energy saving effect of the vehicle. In addition, the solution helps improve reliability and a service life of the brake 210, and improve vehicle safety.

Still refer to FIG. 8. The brake 210 includes a brake disc 211, a first friction block 212, and a second friction block 213. The first friction block 212 is fixedly connected to the piston 120, and the piston 120 may drive the first friction block 212 connected to the piston 120 to move. The first friction block 212 is in a transmission connection to the second friction block 213, and the first friction block 212 and the second friction block 213 can move close to each other or move away from each other. In other words, when the piston 120 drives the first friction block 212 to move, the first friction block 212 can simultaneously drive the second friction block 213 to move, so that the first friction block 212 and the second friction block 213 can move close to each other or move away from each other. Therefore, when the piston 120 drives the first friction block 212 to move, the first friction block 212 and the second friction block 213 may be made close to or away from each other. The brake disc 211 is disposed between the first friction block 212 and the second friction block 213. When driving the first friction block 212 to move, the piston 120 may drive the first friction block 212 and the second friction block 213 to clamp the brake disc 211 or release the brake disc 211. When the piston 120 drives the first friction block 212 to approach the brake disc 211, the first friction block 212 and the second friction block 213 clamp the brake disc 211 to perform braking. When braking is required, the piston 120 drives the first friction block 212 to move away from the brake disc 211, and the first friction block 212 and the second friction block 213 release the brake disc 211. In this case, driven by the motor assembly 160, the nut 140 moves in a direction away from the brake disc 211, and the elastic piece 130 may drive the piston 120 to move in the direction away from the brake disc 211, so that the first friction block 212 and the second friction block 213 can be driven to be detached from the brake disc 211, and no adhesion occurs.

Figure 9:
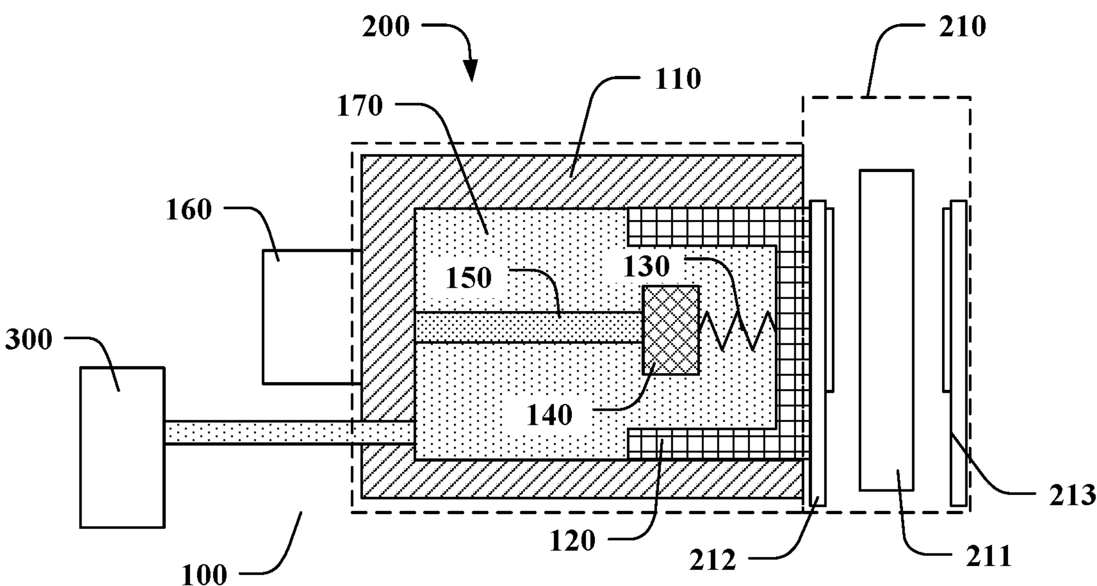
FIG. 9 is a schematic diagram of another structure of a brake system according to an embodiment of this application.

FIG. 9 is a schematic diagram of another structure of a brake system according to an embodiment of this application. As shown in FIG. 9, a brake system 200 in this embodiment of this application may further include a hydraulic apparatus 300. The hydraulic apparatus 300 is connected to an accommodating cavity 170 between a cylinder body 110 and a piston 120. The hydraulic apparatus 300 may inject liquid into or extract liquid from the accommodating cavity 170 to drive the piston 120 to move. The hydraulic apparatus 300 uses the accommodating cavity 170 to apply a hydraulic braking force to a brake 210 through the piston 120, so as to drive the brake 210 to brake. When the brake system 200 is applied, the hydraulic apparatus 300 and a motor assembly 160 may be used cooperatively. This enriches application scenarios of the brake system. In a specific embodiment, in a running process of a vehicle, the hydraulic apparatus 300 is used to perform braking. In this case, even if a position of a nut 140 does not change, a force of the hydraulic apparatus 300 may offset a force of an elastic piece 130, to drive the piston 120 to move towards a direction approaching to a brake disc 211. In this case, the elastic piece 130 stores energy. When braking is canceled, the elastic piece 130 releases energy, and may drive a friction block 212 to release the brake disc 211 at a fast speed. In addition to reducing a dragging torque, this embodiment can also reduce situations of a hydraulic pump of the hydraulic apparatus 300 being stuck. Self-locking can be implemented between a screw 150 and the nut 140.

Therefore, when the vehicle is parked, the motor assembly 160 may be used to park the vehicle. In a long-term parking process, the motor assembly 160 may be turned off, provided that it is ensured that the motor assembly 160 drives the nut 140 through the screw 150 to move to a specified position. The nut 140 may be in the specified position, and is not reset. This solution has good energy saving effect, and is conducive to improving a service life of the brake system 200.

Figure 10:
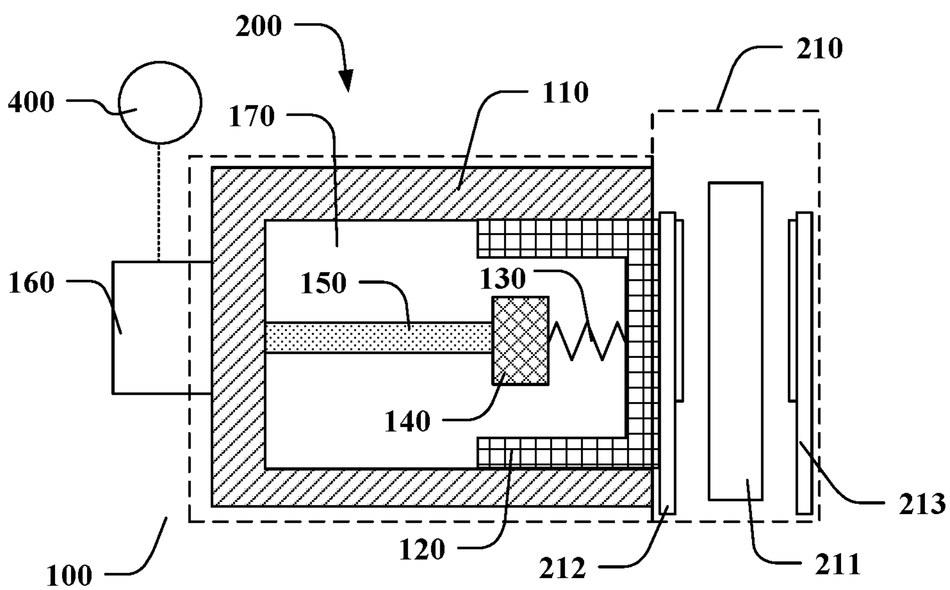
FIG. 10 is a schematic diagram of another structure of a brake system according to an embodiment of this application.

FIG. 10 is a schematic diagram of another structure of a brake system according to an embodiment of this application. As shown in FIG. 10, a brake system 200 in this embodiment of this application may further include an electronic control unit 400, and the electronic control unit 400 is in a signal connection to a motor assembly 160. The electronic control unit 400 is in a signal connection to the motor assembly 160 means that a signal may be transmitted between the electronic control unit 400 and the motor assembly 160. The electronic control unit 400 may be electrically connected to the motor assembly 160, to implement signal transmission, or the electronic control unit 400 may be in a signal connection to the motor assembly 160 in a wireless manner, to implement signal transmission. This is not limited in this application. The electronic control unit 400 may control the motor assembly 160 to rotate forward, rotate backward, or stop rotating. The forward rotation and the backward rotation of the motor assembly 160 are relative concepts. For example, if when the motor assembly 160 rotates forward, the motor assembly 160 drives a nut 140 to drive a piston 120, so as to drive a brake 210 to implement braking, when the motor assembly 160 rotates backward, the motor assembly 160 may drive the nut 140 to drive the piston 120 to move in a reverse direction, so as to drive the brake 210 to cancel braking. Certainly, when the motor assembly 160 stops rotating, because self-locking may be implemented between the nut 140 and a screw 150, the nut 140 may be kept at a current position. The current position may be understood as a position at which the nut 140 is located when the motor assembly stops rotating.

In a specific technical solution, a specific form of the electronic control unit is not limited. For example, the electronic control unit may be a control unit in an electric parking brake. Alternatively, the electronic control unit may be a control unit in another system. This is not limited in this application.

In a specific use process, the electronic control unit 400 may be connected to a control button, and an operator operates the control button to send a control signal to the electronic control unit 400, so that the electronic control unit 400 controls, based on the control signal, the motor assembly 160 to rotate forward, rotate backward, or stop rotating. Alternatively, the electronic control unit 400 may be in a signal connection to a controller, and the controller sends a control signal to the electronic control unit 400 based on a current vehicle running status or another control signal, so that the electronic control unit 400 controls, based on the control signal, the motor assembly 160 to rotate forward, rotate backward, or stop rotating. Alternatively, the electronic control unit 400 may determine a current vehicle running status or receive another control signal, to control the motor assembly 160 to rotate forward, rotate backward, or stop rotating.

Figure 11:
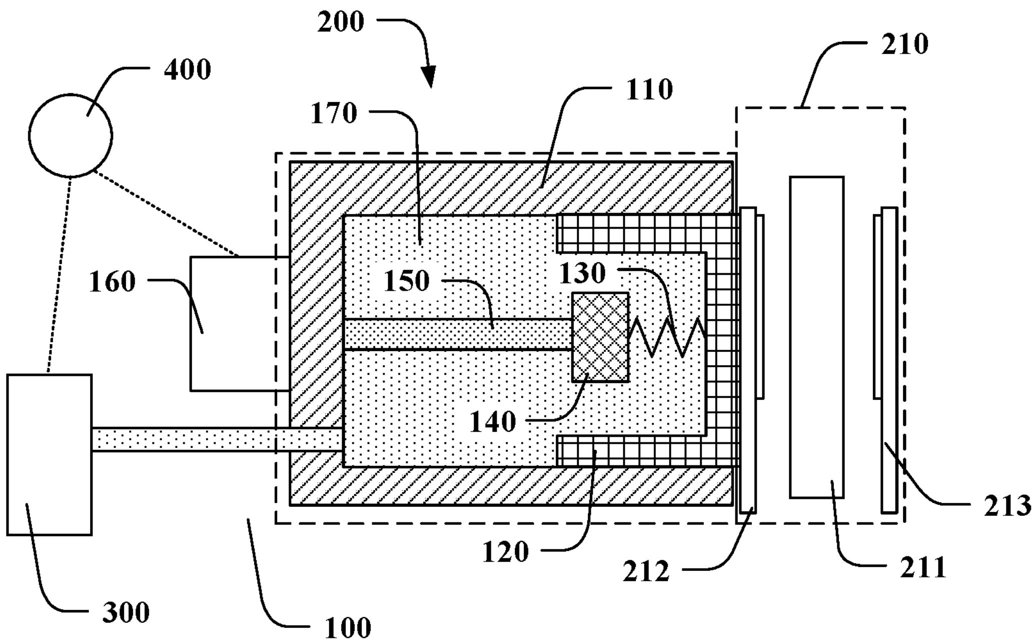
FIG. 11 is a schematic diagram of another structure of a brake system according to an embodiment of this application.

FIG. 11 is a schematic diagram of another structure of a brake system according to an embodiment of this application. As shown in FIG. 11, when a brake system 200 in this embodiment of this application includes a hydraulic apparatus 300, an electronic control unit 400 is further in a signal connection to the hydraulic apparatus 300. The electronic control unit 400 is in a signal connection to the hydraulic apparatus 300 means that a signal may be transmitted between the electronic control unit 400 and the hydraulic apparatus 300. In other words, in this embodiment, the electronic control unit 400 may be directly electrically connected to the hydraulic apparatus 300, or may be connected to the hydraulic apparatus 300 in a wireless manner, so as to implement signal transmission. In this solution, the electronic control unit 400 controls both the hydraulic apparatus 300 and a motor assembly 160. This can coordinate collaboration between the hydraulic apparatus 300 and the motor assembly 160, so as to avoid that the hydraulic apparatus 300 and the motor assembly 160 brake at the same time, resulting in an excessively large total braking force, and a friction block 212 is easily stuck to a brake disc 211. Therefore, this solution helps reduce a dragging torque, implement energy saving and emission reduction of a vehicle, improve working reliability and a service life of the brake system 200, and improve safety of the vehicle.

Figure 12:
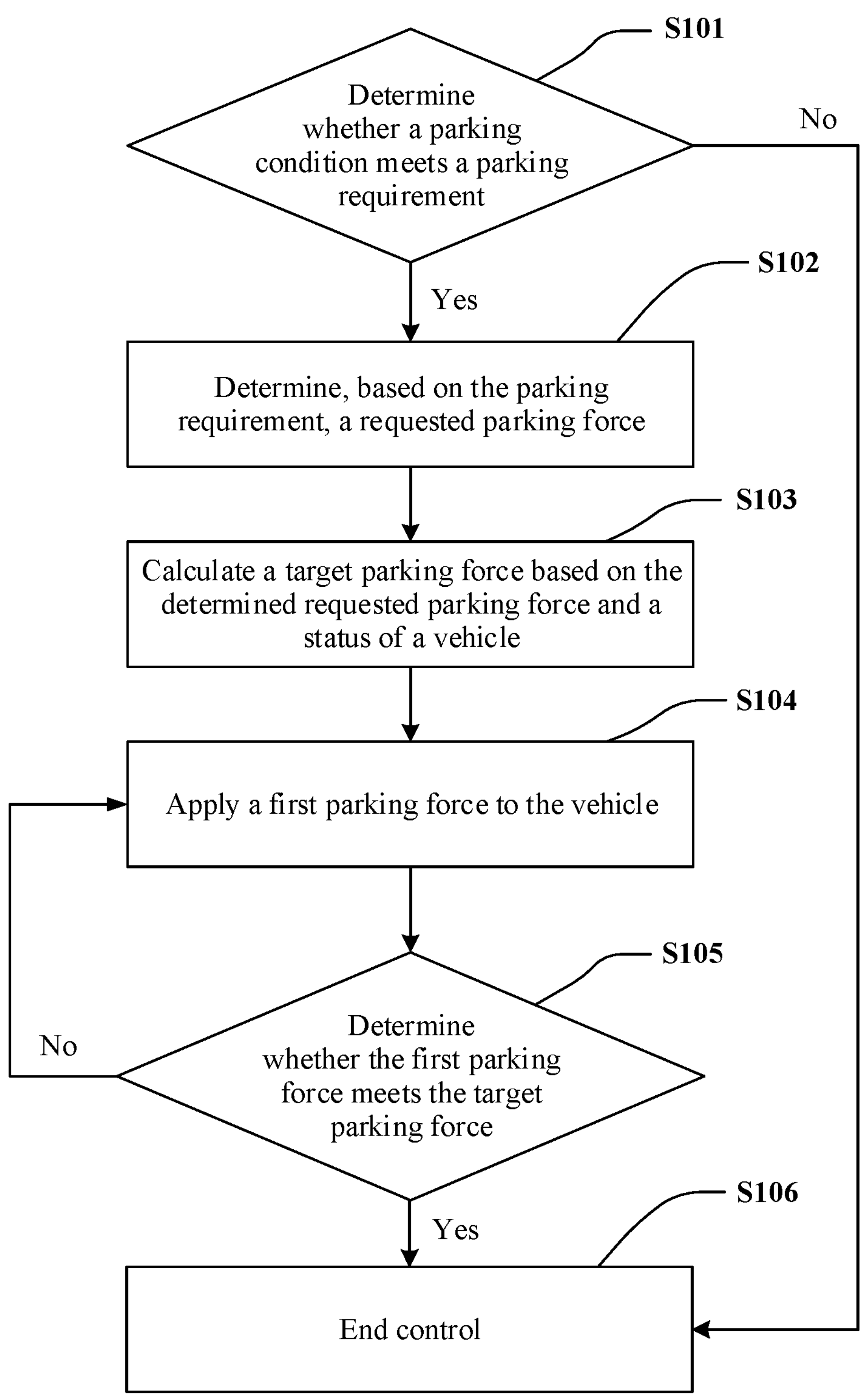
FIG. 12 is a control flowchart of a brake system according to an embodiment of this application.

FIG. 12 is a control flowchart of a brake system according to an embodiment of this application. With reference to FIG. 1 and FIG. 12, in a specific embodiment, the electronic control unit 400 is configured to perform the following steps of a control method of the brake system 200:

Step S101: Determine whether a parking condition meets a parking requirement, and if the parking condition meets the parking requirement, perform step S102, or if the parking condition does not meet the parking requirement, perform step S105.

In this step, the electronic control unit 400 first determines whether a vehicle can be parked currently, and the vehicle can be parked only when the parking requirement is met. In other words, a control process continues to be performed, and step S102 is performed. Otherwise, when the parking condition does not meet the parking requirement, the control process ends. In a specific embodiment, the parking condition may include whether a parking request signal exists, and conditions such as a current vehicle speed, a wheel speed, and a throttle pedal opening. The parking requirement may include a triggered parking request signal, a vehicle speed being lower than a specified speed, a wheel speed being lower than a specified wheel speed, a throttle pedal opening being greater than a specified threshold, and the like. Step S102 continues to be performed only when the parking condition meets the parking requirement.

Step S102: Determine, based on the parking requirement, a requested parking force.

The parking requirement may include an external requirement and an electric parking brake requirement. The external requirement requests a first requested parking force, and the electric parking brake requirement requests a second requested parking force. When the parking condition meets the external requirement, it is determined that the requested parking force is the first requested parking force. When the parking condition meets the electric parking brake requirement, it is determined that the requested parking force is the second requested parking force.

In some possible implementations, determining, based on the parking requirement, the requested parking force may include: determining a start flag bit based on the parking requirement; and determining, based on the determined start flag bit, the requested parking force. The start flag bit at least indicates information of requesting parking, and the start flag bit corresponds to the requested parking force. Different parking requirements may correspond to different requested parking forces. The external requirement corresponds to a first start flag bit, and the electric parking brake requirement corresponds to a second start flag bit. When it is determined that the parking condition meets the external requirement, it may be determined that the first start flag bit is the start flag bit, and the first start flag bit corresponds to the first requested parking force. In this case, it may be determined that the first requested parking force is the requested parking force. Similarly, when it is determined that the parking condition meets the electric parking brake requirement, it may be determined that the second start flag bit is the start flag bit, and the second start flag bit corresponds to the second requested parking force. In this case, it may be determined that the second requested parking force is the requested parking force. In other words, in an embodiment, before the requested parking force is determined, the start flag bit may be alternatively determined first, so as to determine the requested parking force based on the start flag bit. In a specific embodiment, the first requested parking force and the second requested parking force are independent of each other, and may be the same or may be different. This is not limited in this application.

Step S103: Calculate a target parking force based on the determined requested parking force and a status of the vehicle.

The status of the vehicle may include one or more of a ramp on which the vehicle is located, a mass of the vehicle, whether a trailer is attached to the vehicle, a temperature of a brake disc 211, and the like. All the foregoing factors affect the target parking force to some extent. Because an excessively large parking force causes a large loss to the brake system 200, and a large dragging torque is easily generated, the target parking force needs to enable the vehicle to be parked stably, and the target parking force does not need to be excessively large.

In some possible implementations, step S102 and step S103 may be alternatively replaced with the following steps: determining the start flag bit based on the parking requirement; and calculating the target parking force based on the determined start flag bit and the status of the vehicle. For the parking requirement, the start flag bit, and the status of the vehicle, refer to the foregoing descriptions. Details are not described herein again.

Step S104: Apply a first parking force to the vehicle.

The first parking force may be continuously applied to the vehicle by controlling the brake system 200.

Step S105: Determine whether the first parking force meets the target parking force; and if the first parking force does not meet the target parking force, perform step S104, or if the first parking force meets the target parking force, perform step S106.

Step S106: End control.

When the first parking force does not meet the target parking force, the first parking force continues to be applied to the vehicle until the first parking force meets the target parking force. When the first parking force meets the target parking force, it is considered that the vehicle can be parked stably. In this case, the first parking force may be stopped being applied to the vehicle, and control is ended.

With reference to FIG. 11, in another embodiment, the brake system 200 may further include the hydraulic apparatus 300, and the electronic control unit 400 is further in a signal connection to the hydraulic apparatus 300. Similarly, in this embodiment, the electronic control unit 400 may be directly electrically connected to the hydraulic apparatus 300, or may be wirelessly connected to the hydraulic apparatus 300, so as to implement signal transmission. Step S103 includes: determining whether the hydraulic apparatus 300 participates in parking braking; and if the hydraulic apparatus 300 participates in parking braking, controlling the hydraulic apparatus 300 to apply a hydraulic braking force, and controlling the motor assembly 160 to apply a motor braking force, where a combined force of the hydraulic braking force and the motor braking force is the first parking force; or if the hydraulic apparatus 300 does not participate in parking braking, controlling the motor assembly 160 to apply a motor braking force, where the motor braking force is the first parking force. In conclusion, in this embodiment of this application, a braking force obtained by the vehicle meets a requirement.

Figure 13:
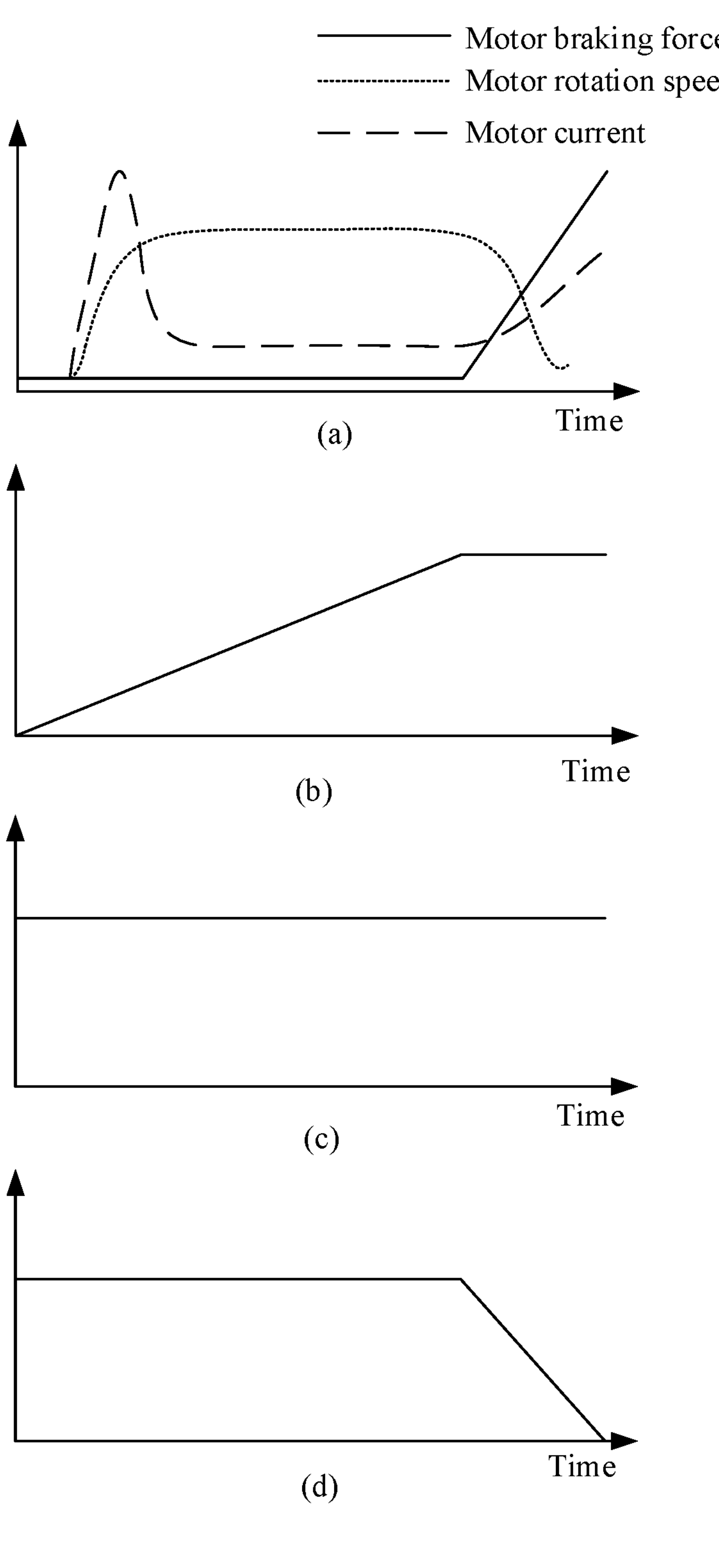
FIG. 13 is a schematic diagram of a working condition of a vehicle in a working process according to an embodiment of this application.

FIG. 13 is a schematic diagram of a working condition of a vehicle in a working process according to an embodiment of this application. As shown in FIG. 13, in a specific embodiment, the hydraulic apparatus 300 participates in parking braking. The hydraulic apparatus 300 may participate in parking braking in a manner in which an operator steps on a braking pedal. In this working condition, the operator starts an electric parking brake program while stepping on the braking pedal, and gradually releases the braking pedal. In this process, as shown in (a) in FIG. 13, a motor is powered on and started, a rotation speed gradually increases and gradually reaches a rated rotation speed, and the rated rotation speed is used to eliminate an empty stroke and a gap between the nut 140 and the piston 120. Then, the friction block 212 is driven to be gradually firmly attached to the brake disc 211, so that the motor braking force gradually increases. Refer to (b) in FIG. 13. In the foregoing process, an elastic force of the elastic piece 130 increases accordingly, and gradually stabilizes to a maximum value. Refer to (c) in FIG. 13. The target parking force is a sum of the hydraulic braking force and the motor braking force minus the elastic force of the elastic piece. In a process in which the driver gradually releases the braking pedal, the target parking force remains unchanged. In the foregoing process, refer to (d) in FIG. 13. A pressure of the hydraulic apparatus 300 gradually decreases as the motor braking force gradually increases. The entire brake system 200 stops working when the pressure of the hydraulic apparatus 300 is zero, and the elastic force of the elastic piece minus the motor braking force is equal to the target parking force. In this case, the nut 140 and a screw 150 implement self-locking, and a position of the nut 140 is fixed, so as to ensure that the motor braking force provided by the motor assembly 160 to the brake 210 through the nut 140 remains unchanged. Therefore, even if the motor assembly 160 does not work, the brake system 200 can still control vehicle parking based on the target parking force. In this solution, cooperation between the motor braking force and the hydraulic braking force can be coordinated, so that a braking force received by a vehicle is suitable for vehicle parking. This avoids unstable parking of the vehicle caused by a too small parking force, and prevents the friction block from being stuck to the brake disc due to an excessively large parking force. Certainly, in the structure of the brake system, even if the friction block is stuck to the braking disc, when parking is canceled, the friction block and the braking disc may be separated at a fast speed. This reduces a dragging torque.

When only the motor assembly 160 performs braking, the motor starts and gradually reaches the rated rotation speed, and the rated rotation speed is used to eliminate the empty stroke and the gap between the nut 140 and the piston 120. Then, the friction block 212 is driven to be gradually firmly attached to the brake disc 211. The motor braking force increases accordingly. When the motor braking force is equal to the target parking force, the entire brake system 200 stops working. In this case, the position of the nut 140 is fixed, and the motor braking force may be continuously provided to the brake 210. Therefore, even if a driving structure does not work, the brake system 200 can still control vehicle parking based on the target parking force.

An electronic control unit has a human-machine interface, and information, such as a current working status of the brake, a fault alarm, and an insufficient parking force alarm, may be displayed on the human-machine interface. The working status of the brake may be that a first friction block and a second friction block are in a state of clamping, clamping completed, releasing, releasing completed, or the like for the brake disc. In the process of braking by using the motor assembly, content that the brake is in the clamping state is displayed on the human-machine interface. When braking is completed, content that the brake is in the clamping completed state is displayed on the human-machine interface. In other words, when the driver does not completely release the braking pedal and remains unchanged, there is still a specific hydraulic braking force. In this case, an actual parking force of the vehicle meets the target parking force, and content that the brake is in the clamping completed state may be displayed on the human-machine interface. Then, the driver releases the braking pedal, and the motor assembly continues to work and applies a motor parking force. In this case, content that the brake is in the clamping state may be displayed on the human-machine interface.

Figure 14:
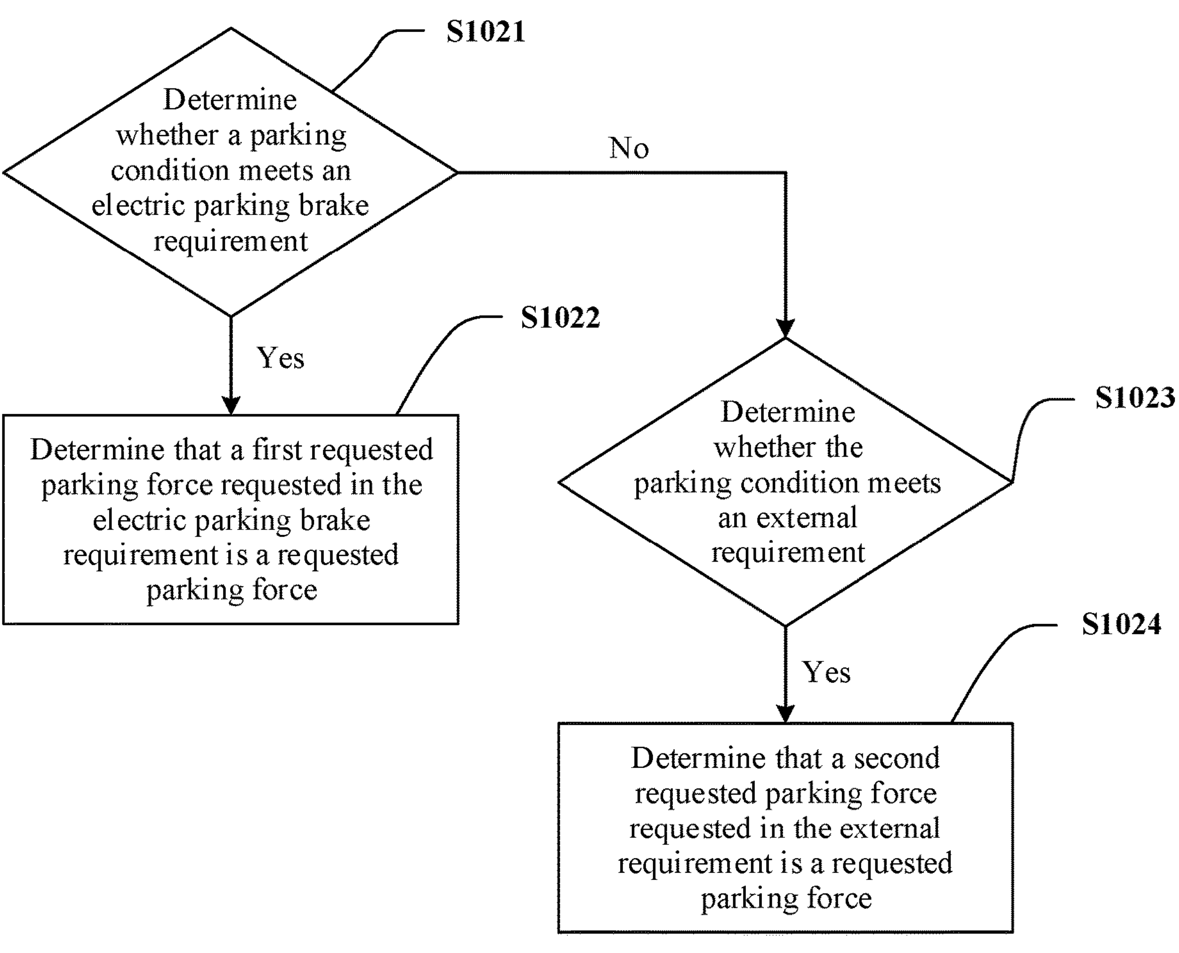
FIG. 14 is another control flowchart of a brake system according to an embodiment of this application.

The parking requirement in step S101 includes the external requirement and the electric parking brake requirement. If the parking condition meets either the external requirement or the electric parking brake requirement, step S102 is performed. FIG. 14 is another control flowchart of a brake system according to an embodiment of this application. As shown in FIG. 14, in a specific embodiment, when the electronic control unit 400 performs step S102, the following steps are further included.

Step S1021: Determine whether the parking condition meets the electric parking brake requirement; and if the parking condition meets the electric parking brake requirement, perform step S1022; or if the parking condition does not meet the electric parking brake requirement, perform step S1023.

Step S1022: Determine that the first requested parking force requested in the electric parking brake requirement is the requested parking force.

Step S1023: Determine whether the parking condition meets the external requirement, and if the parking condition meets the external requirement, perform step S1024.

Step S1024: Determine that the second requested parking force requested in the external requirement is the requested parking force.

In this solution, the external requirement may also be referred to as an external parking requirement, and includes a parking request from another component other than the electronic control unit 400. The external requirement may be a parking requirement sent by another electronic control unit that can interact with the electronic control unit 400 to the electronic control unit 400. The another electronic control unit may be an electronic control unit in autonomous driving of the vehicle, or an electronic control unit of the entire vehicle. The electric parking brake requirement includes a parking request triggered by the driver by using the electronic control unit. In addition, the electric parking brake requirement may further include that an electric parking brake signal exists, a vehicle speed is lower than a specified speed, a wheel speed is lower than a specified wheel speed, and a throttle pedal opening is greater than a specified threshold. Therefore, it is considered that a current status of the vehicle is suitable for parking, and it is determined that the parking condition meets the electric parking brake requirement. In this case, it is determined that the first requested parking force is the requested parking force. There may be an external requirement in the parking condition received by the electronic control unit 400. When the parking condition does not meet the electric parking brake requirement, but the parking condition meets the external requirement, it is determined that the second requested parking force is the requested parking force. In other words, the vehicle may receive two parking requirements: an external requirement and an electric parking brake requirement. When there is an electric parking brake requirement, the vehicle responds to the electric parking brake requirement. If there is no electric parking brake requirement, the vehicle may respond to the external requirement.

Figure 15:
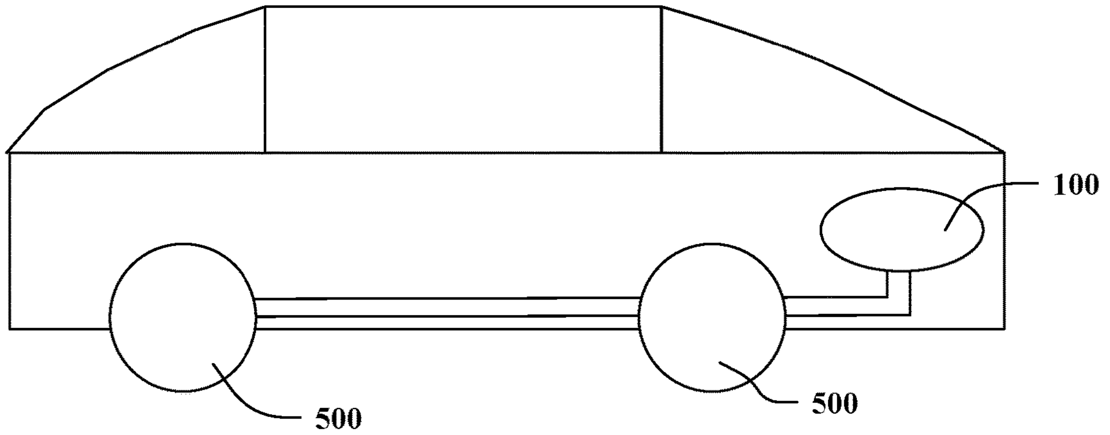
FIG. 15 is a schematic diagram of a structure of a vehicle according to an embodiment of this application.

In an embodiment, this application further provides a vehicle. FIG. 15 is a schematic diagram of a structure of a vehicle according to an embodiment of this application. As shown in FIG. 5, the vehicle includes the brake assembly 100 in any one of the foregoing technical solutions, and the brake assembly 100 is connected to wheels 500. It should be noted that, that the brake assembly 100 is connected to the wheels 500 means that the brake assembly 100 may drive the wheels 500 to stop rotating. The brake assembly 100 and the wheels 500 may be connected through another auxiliary structure, for example, a structure like a brake 210. In this solution, when the brake assembly 100 cancels braking, a nut 140 pulls a piston 120 to reset, so that the piston 120 is reset quickly, to drive a friction block 212 to be detached from a brake disc 211. This can reduce a generated dragging torque, reduce travel resistance of a vehicle, and enhance energy saving effect of the vehicle. In addition, the solution helps improve reliability and a service life of the brake 210, and improve vehicle safety.

Figure 16:
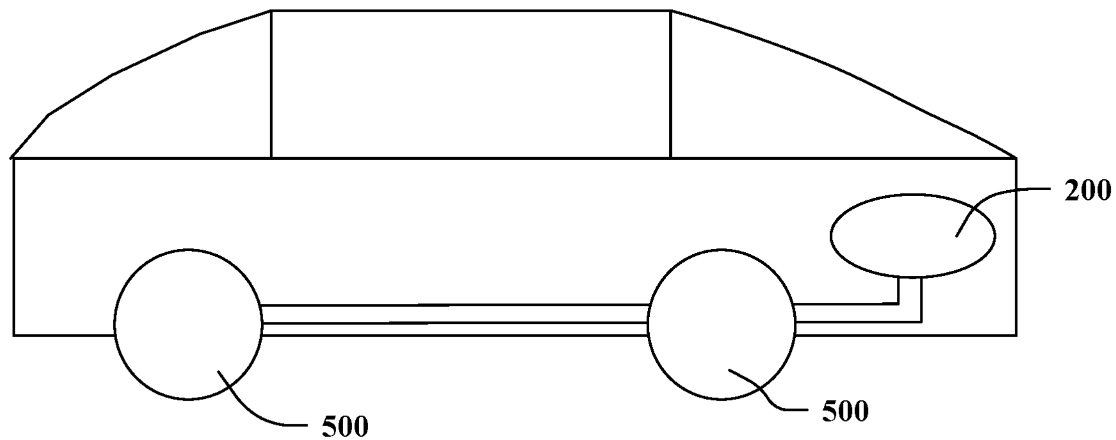
FIG. 16 is a schematic diagram of another structure of a vehicle according to an embodiment of this application.

In another embodiment, an embodiment of this application further provides a vehicle. FIG. 16 is a schematic diagram of another structure of a vehicle according to an embodiment of this application. As shown in FIG. 16, the vehicle includes the brake system 200 in any one of the foregoing technical solutions, and the brake system 200 is connected to wheels 500. Similarly, in this embodiment, when the brake system 200 is connected to the wheels 500, the brake system 200 may be directly connected to the wheels 500, or may be connected to the wheels 500 through an intermediate structure, provided that the brake system 200 can drive the wheels 500 to brake. In this solution, a dragging torque generated by the vehicle in a braking process is small, so that travel resistance of the vehicle can be reduced, and energy saving effect of the vehicle can be enhanced. In addition, the solution helps improve reliability and a service life of a brake 210, and improve vehicle safety.

Certainly, a person skilled in the art can make various modifications and variations to this application without departing from the protection scope of this application. In this way, this application is intended to cover these modifications and variations of this application provided that they fall within the scope of the claims of this application and their equivalent technologies.

What is claimed is:

1. A brake assembly, comprising:

a cylinder body comprising an inner cavity;

a piston mounted in the inner cavity, wherein the piston and the inner cavity form an accommodating cavity;

a driving piece disposed in the accommodating cavity, wherein the driving piece is configured to drive the piston to move;

an elastic piece disposed in the accommodating cavity, wherein the piston is coupled to the driving piece through the elastic piece;

a first limiting piece pivotally mounted on the driving piece; and a second limiting piece pivotally mounted on the piston such that the elastic piece is mounted between the first limiting piece and the second limiting piece.

2. The brake assembly of claim 1, wherein the driving piece has a first limiting protrusion and the elastic piece is sleeved on an outer side of the first limiting protrusion, or wherein the driving piece has a first limiting groove and the elastic piece is provided in the first limiting groove.

3. The brake assembly of claim 1, wherein the piston has a second limiting protrusion and the elastic piece is sleeved on an outer side of the second limiting protrusion, or wherein the piston has a second limiting groove and the elastic piece is provided in the second limiting groove.

4. The brake assembly of claim 1, wherein the driving piece comprises a first mounting boss, wherein the first limiting piece is pivotally mounted on the first mounting boss, wherein the piston comprises a second mounting boss, and wherein the second limiting piece is pivotally mounted on the second mounting boss.

5. A brake system, comprising:

a cylinder body comprising an inner cavity;

a piston mounted in the inner cavity, wherein the piston and the inner cavity form an accommodating cavity;

a driving piece disposed in the accommodating cavity, wherein the driving piece is configured to drive the piston to move;

an elastic piece disposed in the accommodating cavity, wherein the piston is coupled to the driving piece through the elastic piece;

a first limiting piece pivotally mounted on the driving piece;

a second limiting piece pivotally mounted on the piston such that the elastic piece is mounted between the first limiting piece and the second limiting piece; and a motor assembly in a transmission connection to the driving piece, wherein the motor assembly is configured to drive the driving piece.

6. The brake system of claim 5, wherein the driving piece has a first limiting protrusion and the elastic piece is sleeved on an outer side of the first limiting protrusion, or wherein the driving piece has a first limiting groove and the elastic piece is provided in the first limiting groove.

7. The brake system of claim 5, wherein the piston has a second limiting protrusion and the elastic piece is sleeved on an outer side of the second limiting protrusion, or wherein the piston has a second limiting groove and the elastic piece is provided in the second limiting groove.

8. The brake system of claim 5, wherein the driving piece comprises a first mounting boss, wherein the first limiting piece is pivotally mounted on the first mounting boss, wherein the piston comprises a second mounting boss, and wherein the second limiting piece is pivotally mounted on the second mounting boss.

9. The brake system of claim 5, further comprising a brake coupled to the piston, wherein the motor assembly is configured to apply a motor braking force to the brake through the piston, and wherein the motor braking force is configured to drive the brake to brake.

10. The brake system of claim 9, wherein the brake comprises:

a first friction block coupled to the piston;

a second friction block in a transmission connection to the first friction block, wherein the first friction block and the second friction block are configured to move close to each other or move away from each other; and a brake disc disposed between the first friction block and the second friction block, wherein the driving piece is configured to drive, through the piston, the first friction block and the second friction block to clamp the brake disc or release the brake disc.

11. The brake system of claim 9, further comprising a hydraulic apparatus coupled to the accommodating cavity, wherein the hydraulic apparatus is configured to apply a hydraulic braking force to the brake through the piston, and wherein the hydraulic braking force is configured to drive the brake to brake.

12. The brake system of claim 5, further comprising an electronic controller in electrical communication with the motor assembly, wherein the electronic controller is configured to control the motor assembly to rotate forward, rotate backward, or stop rotating.

13. The brake system of claim 12, wherein the electronic controller is further configured to perform vehicle parking by:

determining, based on a parking requirement, a requested parking force when a parking condition meets the parking requirement;

calculating a target parking force based on the requested parking force and a status of a vehicle; and applying a first parking force to the vehicle until the first parking force meets the target parking force.

14. The brake system of claim 13, further comprising a hydraulic apparatus in electrical communication with the electronic controller, wherein the electronic controller is configured to apply the first parking force to the vehicle by:

determining whether the hydraulic apparatus is configured to perform parking braking;

controlling, when the hydraulic apparatus performs parking braking, the hydraulic apparatus to apply a hydraulic braking force;

controlling the motor assembly to apply a motor braking force, wherein the first parking force comprises the hydraulic braking force and the motor braking force; and controlling, when the hydraulic apparatus does not participate in parking braking, the motor assembly to apply the motor braking force, wherein the first parking force comprises the motor braking force.

15. The brake system of claim 13, wherein the parking requirement comprises an external requirement and an electric parking brake requirement, and wherein determining, based on the parking requirement, the requested parking force when the parking condition meets the parking requirement comprises:

determining, when the parking condition meets the electric parking brake requirement, that a first requested parking force requested in the electric parking brake requirement is the requested parking force; and determining, when the parking condition does not meet the electric parking brake requirement but meets the external requirement, that a second requested parking force requested in the external requirement is the requested parking force, wherein the external requirement comprises a parking request from another component other than the electronic controller, and wherein the electric parking brake requirement comprises the parking request triggered by a driver using the electronic controller.

16. The brake system of claim 13, wherein the status of the vehicle comprises at least one of a ramp on which the vehicle is located, a mass of the vehicle, or whether a trailer is attached to the vehicle.

17. A vehicle, comprising:

wheels; and a brake assembly comprising:

a cylinder body comprising an inner cavity;

a piston mounted in the inner cavity, wherein the piston and the inner cavity form an accommodating cavity;

a driving piece disposed in the accommodating cavity, wherein the driving piece is configured to drive the piston to move;

an elastic piece disposed in the accommodating cavity, wherein the piston is coupled to the driving piece through the elastic piece;

a first limiting piece pivotally mounted on the driving piece; and a second limiting piece pivotally mounted on the piston such that the elastic piece is mounted between the first limiting piece and the second limiting piece, wherein the brake assembly is coupled to the wheels, and wherein the brake assembly is configured to drive the wheels to brake.

18. The vehicle of claim 17, wherein the driving piece comprises a first mounting boss, wherein the first limiting piece is pivotally mounted on the first mounting boss, wherein the piston comprises a second mounting boss, and wherein the second limiting piece is pivotally mounted on the second mounting boss.

19. The vehicle of claim 17, wherein the driving piece has a first limiting protrusion and the elastic piece is sleeved on an outer side of the first limiting protrusion, or wherein the driving piece has a first limiting groove and the elastic piece is provided in the first limiting groove.

20. The vehicle of claim 17, wherein the piston has a second limiting protrusion and the elastic piece is sleeved on an outer side of the second limiting protrusion, or wherein the piston has a second limiting groove and the elastic piece is provided in the second limiting groove.

* * * * *